United States Patent [19]

Clegg et al.

[11] Patent Number: 4,822,627
[45] Date of Patent: Apr. 18, 1989

[54] FROZEN CONFECTION SUITABLE FOR DEEP FRYING

[75] Inventors: Melodee L. Clegg; Terry R. Clegg, both of Salt Lake City, Utah

[73] Assignee: International Fried Ice Cream, Salt Lake City, Utah

[21] Appl. No.: 783,784

[22] Filed: Oct. 3, 1985

[51] Int. Cl.$^4$ .............................................. A23G 3/00
[52] U.S. Cl. ................................... 426/101; 426/249; 426/565; 426/439; 426/303; 426/293; 426/294; 426/296; 426/307; 426/104
[58] Field of Search ................. 426/95, 293, 900, 101, 426/139, 291, 249, 293, 439, 496, 502, 294, 104, 294, 296, 303

[56] References Cited

U.S. PATENT DOCUMENTS

| | | | |
|---|---|---|---|
| 1,445,187 | 2/1923 | Vaughn | 426/283 |
| 2,191,352 | 2/1940 | Oprean | 426/101 |
| 2,404,177 | 7/1946 | Jetschmann | 426/95 |
| 4,020,188 | 4/1977 | Forkner | 426/438 |
| 4,068,009 | 1/1978 | Rispoli et al. | 426/293 |
| 4,171,380 | 10/1979 | Forkner | 426/439 |
| 4,199,603 | 4/1980 | Sortwell, III | 426/293 |
| 4,518,620 | 5/1985 | Monagle | 426/293 |

FOREIGN PATENT DOCUMENTS 2905605 9/1979 Fed. Rep. of Germany ...... 426/100

*Primary Examiner*—Jeanette Hunter
*Attorney, Agent, or Firm*—Thorpe, North & Western

[57] ABSTRACT

A frozen confectionery product is formed as a bonded composite of an inner core of frozen dessert having a first liquid coating solidified around and physically bonded to the frozen core with a second coating of dry food crumbs partially embedded in the first coating. A third coating of liquid batter enrobes the first and second coating and is physically bonded thereto to form an integral, composite structure. The product may be stored for long intervals and transported without adverse effect on either frozen core or multi-layered coatings. The product is suitable for cooking in hot vegetable oil without adversely affecting the frozen core.

25 Claims, 3 Drawing Sheets

FROZEN CONFECTION SUITABLE FOR DEEP FRYING

BACKGROUND OF THE INVENTION

1. Field of the Invention

The present invention pertains to a multilayered food product having an inner core of frozen novelty such as ice cream and multiple outer layers which can be deep-fried without adversely affecting the frozen core. More particularly, this invention pertains to a food product as described above which can be prepared and stored in its frozen state for transport to geographically dispersed user locations for subsequent cooking and consumption.

2. Prior Art

The novelty of contrast found in a deep-fried ball of ice cream has tempted the human appetite for many years. This unusual dessert was perhaps an outgrowth of earlier frozen desserts which were encased in a pastry shell. U.S. Pat. No. 1,445,187; 1,558,940; 1,813,099; and 2,404,177 are representative of early combinations of ice cream desserts enclosed in an outer coating or shell. The cooking stage was typically in an oven which subjected the exterior covering to intense, dry heat. Although the product offered the contrasting frozen novelty and hot crust, the product was commerically impractical because it was expensive to make, difficult to store and unsatisfactory in quality.

U.S. Pat. No. 4,020,188 illustrates the adaption of this novelty to deep frying procedures. This disclosure presents a commercial attempt to prepare an uncooked form of fried ice cream similar to that prepared from original ingredients in restaurants. The 188 patent first involves formation of an exterior layer of dough which will later be formed around the ice cream core. One side of this dough layer is coated with a material that provides an insulative layer and protective backing against the ice cream. The actual formation of the combined ice cream core and enclosing dough shell is accomplished by draping or wrapping the multilayered sheet of dough material around the core of ice cream. The outer layer of dough can then be subjected to the hot oil for momentary cooking without destroying the enclosed ice cream. The protective coating also imposes a barrier to absorption of liquid from the ice cream into the surrounding dough before, during and after cooking. It is significant to note that the 188 patent does not teach the formation of the multilayered dough material at the surface of the ice cream core. Instead, the composite dough and insulative layer is prepared separate from the ice cream and is then physically compressed against the core.

In connection with prior art attempts to prepare the desired novelty dessert various difficulties have impeded commercialization into mass market areas such as restaurants and food chain stores. Improper material selections, unaccepable moisture transfer, excessive processing requirements, and difficulty with storage have continued to discourage mass production. Generally, the uncooked product was simply not well suited for prolonged storage and transport which is necessary for mass marketing. With respect to such desserts prepared in deep fat fryers, excessive loss of fines into the hot oil added further cost to an already expensive procedure because of food processing requirements. Furthermore, oil absorption into the batter coating during cooking, as well as other factors previously mentioned, have affected the flaver and texture of the final fried, frozen dessert. As a consequence, the availability of such novelties as "fried ice cream" has been commercially limited to restaurants which prepare the desserts inhouse. Even methods for inhouse preparations have been accompanied with heavy loss of fines in the cooking oil and in separation of the dough coating from the ice cream, as well as lack of preferred insulative barrier between the coating and ice cream.

OBJECTS AND SUMMARY OF THE INVENTION

It is therefore an object of the present invention to provide an improved batter covered frozen ice cream dessert capable of submersion in hot cooking oil without adversely affecting the taste and texture of the final product.

It is a further object of this invention to provide such a frozen dessert which has integral contact between the batter layer and enclosed ice cream core to form a single composite product.

It is a still further object of this invention to provide a frozen dessert in which the outer batter coating is bonded directly to the ice cream core to provide better retention during the cooking procedure It is yet another object to provide a frozen dessert in which the outer layer fully encloses the core of ice cream to retain the cold temperature within the enclosure and restrict heat flow from entry into the enclosed volume.

A still further object of this invention is to provide a frozen dessert product which includes a moisture barrier between the enclosed ice cream and dough covering which protects during storage but is substantially eliminated during the cooking process to leave only the cooked crust and enclosed ice cream.

It is an additional object of this invention to provide a method of manufacture which is adapted for developing a frozen dessert product as described in the foregoing objectives.

These and other objectives are realized in a frozen food confectionary or dessert product which includes an innercore of frozen food substance enrobed at its surface with a first, thin, frozen liquid coating applied and solidifed at the frozen surface to physically bond a matrix coating directly to the frozen core. A second coating made of dry food crumbs which have been partially embedded in the first, liquid coating prior to solidification enrobes the frozen core and cooperates with the first coating to insulate the frozen dessert and establish a moisture barrier with respect thereto. A third coating applied around the second coating comprises a liquid batter which is solidified in an uncooked state to form an outer coating physically bonded to the second coating and totally enclosing the same. The combination can be immersed in hot cooking oil to convert the third coating of batter into a crisp, exterior covering without adversely affecting the enclosed frozen substance. Additional coating materials can be applied to provide a variety of taste and textures to the frozen dessert. Such substances would constitute a fourth layer and would be at least partially embedded in the uncooked, liquid batter prior to solidification.

Also disclosed is a method for preparing the frozen food product, which comprises the steps of:

forming a core of frozen dessert to be enclosed within the outer, uncooked coating;

providing the frozen core with a first layer of eatable liquid formed around the frozen core;

immediately enrobing the first layer of liquid with a second coating comprising dry food crumbs which are partially embedded in the first coating while in its liquid state;

subjecting the product of the preceding step to a quick freeze environment to congeal the first liquid with the food crumbs in a bonded configuration to the frozen core;

coating the congealed product of the preceding step with an uncooked liquid batter which is suitable for being subjected to a later cooking process; and subjecting the product of the preceding step to a quick freeze environment to congeal the liquid batter to a hardened state suitable for temporary freezer storage Additional steps may be added to the process for coating with condiment layers to vary flavor and texture in the final product. Also disclosed is a final coating step which applies a shallow layer of powdered corn syrup solids over the coated frozen product.

The referenced methods develop a frozen food product which retains its outer coating to the core of frozen food substance, despite the intense heat of deep frying in vegetable oil. In addition, the ingredients and outlined procedures provide improved moisture barrier between the coating and frozen core and also enable extended periods of storage. These factors, along with the sturdiness of the bonded attachment of the coating to the frozen food substance as a single composite structure overcomes the longstanding problems which have frustrated commercialization of this product on a mass production basis. Other benefits and features will be apparent to those skilled in the art from the following detailed description, taken in view of the accompanying drawings.

BRIEF DESCRIPTION OF THE DRAWINGS

FIG. 3 is a cross-sectional view taken along the lines 3—3.

FIG. 4 is a cross-sectional view taken along the lines 4—4.

DETAILED DESCRIPTION OF THE INVENTION

Figure 3:
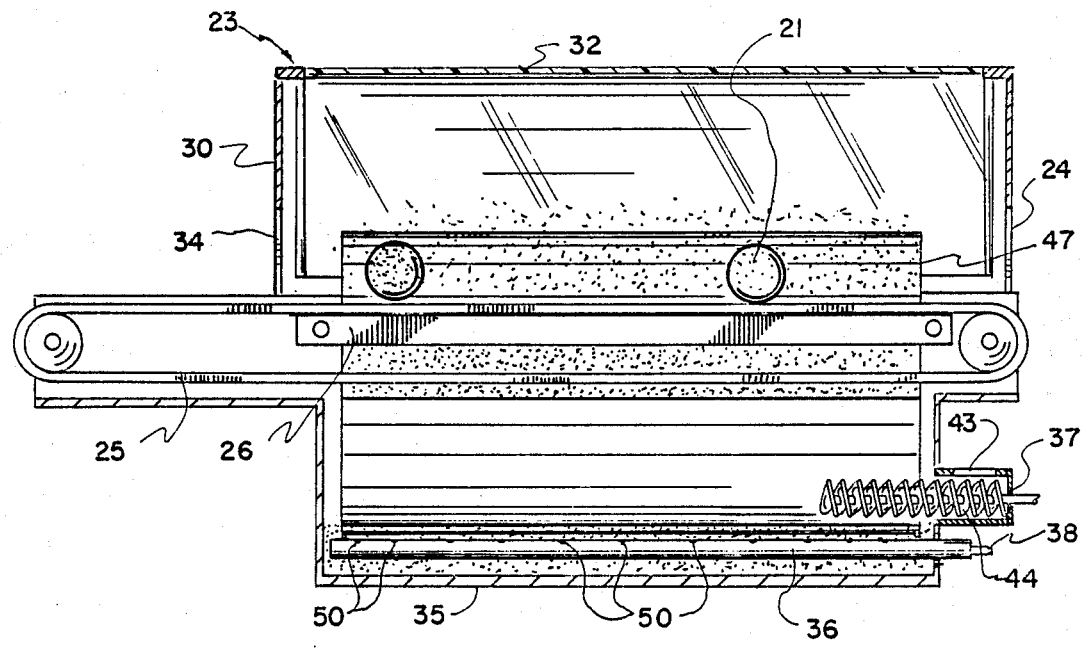
FIGS. 2-4 graphically portray a method and apparatus for applying powdered corn syrup solids to the final coating of the frozen food product prior to packaging for storage.

REFERRING NOW TO THE DRAWINGS:

A frozen food product 10 prepared in accordance with the method and teachings of the present invention is generally illustrated. It includes an innercore of frozen food substance such as ice cream, puddings, confections and other food items generally categorized as frozen food desserts. Typically, such products will be of a type that are subject to melting or degradation upon being placed in a hot oven or in hot cooking oil; however, other types of frozen food desserts may be equally suitable to the application of a coating material which can be subjected to deep frying or other cooking procedures.

Figure 1:
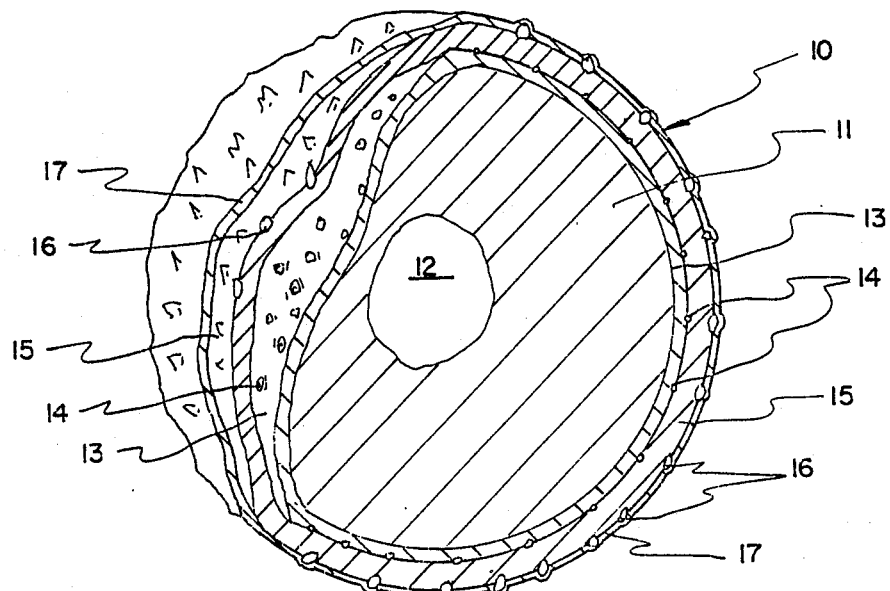
FIG. 1 shows a perspective, partial cutaway view of one embodiment of the frozen food product with its respective layers identified.

Although the frozen food core 11 is shown to be of uniform composition, it could just as well be formed of a combination of different food substances which are swirled, mixed or otherwise combined. FIG. 1 also illustrates the placement of an inner core 12 of confectionary substance within the primary frozen food product core 11. If the primary core 11 were ice cream or similar frozen dessert, the inner core might be comprised of marshmellow or fudge, or other condiments which are compatible with the ice cream composition.

The frozen food substance 11 has a first liquid coating 13 which is applied around the core 11 in a liquid state to develop full coverage and contact with the surface of the core substance 11. As this first liquid 13 is applied, the frozen nature of the core 11 causes the liquid to congeal or solidify and physically bond to the frozen core surface. It is important that intimate contact be made between this first coating and the surface of the frozen core in order to ensure retention of the total coating materials which circumscribe the core substance. This is in direct contrast to prior art procedures which involve separately forming coating materials in sheets and then wrapping such sheets around the frozen substance to form a shell designed to protect the frozen substance from the effects of a hot oven or cooking oils. Instead of forming these sheets separate from the frozen food, the present invention utilizes the frozen food product as the base or mandrel upon which such coating materials are directly bonded as a frozen matrix. Such procedures not only reduce manufacturing costs and facilitate mass production, but also yield an improved product which becomes a single composite item of integrally coupled layers of coatings collectively bonded to the frozen food core.

A variety of liquid coatings may be utilized to realize the objects of this invention. The most preferred materials comprise a liquid form of the frozen core (i.e. unfrozen ice cream mix) Other liquids include the general category of vegetable oils. Such oils include soybean, peanut, coconut and similar substances which have appropriate viscosity for applying a thin coating of liquid around the frozen core.

Such liquids are sprayed directly on the core and flow into cracks and crevices. Although a specific viscosity range is deemed unnecessary, one skilled in the art will appreciate that the liquid should be sufficiently flowable at the chilled surface of the frozen ice cream or other food substance to totally enclose the frozen substance. Furthermore, the liquid should be sufficiently flowable to allow its migration over the surface of the frozen substance in a thin layer less than 3 millimeters in thickness, and preferably approximately 1 to 2 millimeter in thickness. It should also be sufficiently fluid to allow application through a spraying system suitable for mass production. Although the first liquid coating may provide flavoring to the frozen dessert, it is generally believed preferable to utilize commonly flavored ice cream mix or unflavored oils which neither contribute to nor detract from other flavoring within the frozen core or exterior coating materials applied. Such oils are generally known within the culinary arts and need not be specifically identified by source of manufacture.

It will further be appreciated that other substances may be utilized as the first liquid coating in addition to specific materials previously mentioned; provided that the appropriate bonding is realized between the frozen food core and outer layers. With respect to ice cream products, the outer surface of the frozen food core can in fact be melted to a shallow depth such that the liquid ice cream itself serves a the first liquid coating.

A second coating material made of dry food crumbs or particles 14 is applied to the first liquid coating prior to solidification. Because the food crumbs are applied while the first coating is in its liquid state, these particles are partially embedded in the first frozen matrix coating as illustrated in FIG. 1. The illustrated crumbs or particles 14 are shown in sparse numbers for simplicity of description. In actuality, these dried food crumbs or particles will virtually coat the entire surface of the liquid coating 13. As the liquid coating solidifies, the crumbs 14 are captured and retained in a bonded condition at the surface of the frozen food core. Accordingly, it will be apparent to one skilled in the art that one of the primary purposes of the first liquid coating is to provide a bonding medium at the surface of the frozen core to retain the dried food crumbs or particles at the outer surface as part of a frozen matrix. These particles operate to protect the frozen core against moisture migration and to insulate the core from the intense heat of cooking processes. Also, that portion of the particles which is not embedded within the first liquid coating provides a rough bonding surface to enhance the physical bond between outer coatings to be applied The preferred materials for use as the second coating should be selected from that group of eatable products which will provide a moisture barrier and which will be compatible with the particular first liquid coating utilized. Generally, dried cereal crumbs or particles are suitable materials. Crisped rice products have been found to be particularly effective in satisfying the requirements of the second coating material. This crisped rice substance resists moisture absorption and is readily bonded within the first liquid coating. One product commercially sold under the product designation TINY TOTS by Weetabix Company, Inc. has ideal physical properties including a size range of one to two milimeters in diameter. This product is also well suited for mass production and rapid coating procedures in assembly line production systems.

A third coating comprising a liquid batter 15 is applied around the second coating 14 in liquid form and is solidified in an uncooked state similar to solidification of the first coating. As with the first coating, the third coating totally encloses the frozen core and is physically bonded to the second coating 14 (and exposed portions of the first coating 13 to form a third outer matrix coating 15 as illustrated in FIG. 1). The batter is prepared from ingredients which can be rapidly cooked to form a hot, crisp exterior covering without adversely affecting the enclosed frozen substance. Typical cooking procedures include immersion in hot cooking oil for periods of 10 to 30 seconds. Numerous batter recipes may be suitable, provided they develop the required bonding at the interior first and second coating surfaces. Typically, the batter will include the combined ingredients of egg or egg substitute, sugar, milk, flour baking powder, salt, water and assorted flavoring ingredients. It has been discovered that mass production of the batter and its application within an assembly line process is surprisingly improved by use of whey protein concentrate in place of the egg constituient. It appears that the whey concentrate improves the bonding capapabiity of the batter with respect to the inner first and second layers. Similarly, it has been discovered that the use of corn syrup solids as an ingredient within the batter further improves to the referenced bonding capability.

Specific formulations setting forth the measure of whey protein concentrate and corn syrup solids is set forth hereafter in a preferred embodiment.

A fourth layer of particulate food substance such as crushed cookies 16 may be imbedded in the liquid batter 15. Hereagain, the reduced number of food particles 16 shown embedded in the batter layer 15 is for descriptive purposes only. Actually, the fourth layer of particulate food substance would be coated over the total surface of the batter, making a fourth coating or layer. These food particles 16 are applied to the liquid batter layer 15 prior to its solidification or freezing, thereby causing the food particle 16 to be partially embedded in the batter layer. Many types of confectionary substances may be utilized as part of this fourth layer either separately or in combination. Cookie crumbs, such as those developed with crushed animal crackers and similar sugar cookie preparations have been found to be most preferable in developing the favorable texture and crisp crust found to be most desirable. Other confectionary substances such as crushed candy, nuts, fruit bits, raisins, dates, could also be applied as a fourth layer.

A final layer 17 is illustrated in FIG. 1 and comprises a shallow coating of powdered corn syrup solids. This powdered material tends to form a crisp exterior coating to protect the enclosed frozen food product. This exterior coating also helps to reduce the occurrence of fines or small pieces of the coating which break off in the deep frying process.

Figure 5:
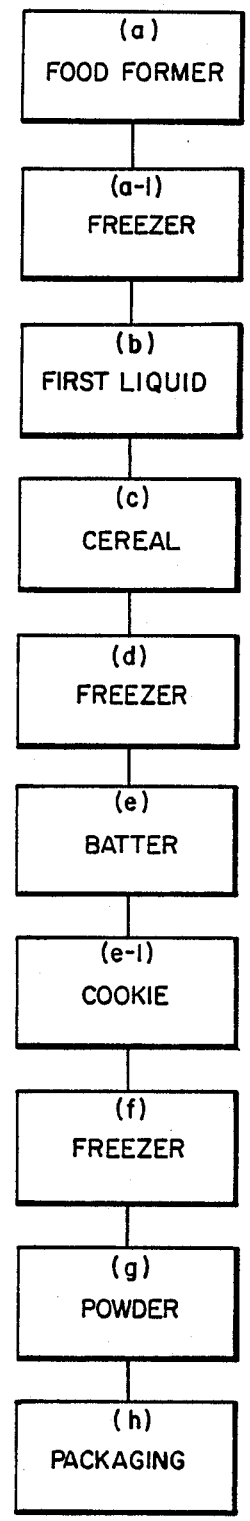
FIG. 5 constitutes a block diagram illustrating the respective steps of the method of manufacture for the subject frozen food product.

The physical characteristics of the respective coatings on the frozen food product arise as a direct result of the process of manufacture. This fact is illustrated by the following general method of preparation for the frozen composite food product described above. Specifically, the method comprises the steps of:

a. Forming a core of frozen food substance to be enclosed within the outer, uncooked, multi-layered coating. This step can be implemented by hand forming the food substance or by machine production of the food in a particular shape. This step is illustrated in FIG. 5 as the "food former". With frozen confections such as ice cream, this graphic step could be accomplished by a machine which forms balls of ice cream in a desired shape. The formed ball dispensed from the food former (a) is introduced into a freezer (a-1) which converts the food to an extreme frozen and hardened condition.

b. Forming a first layer of edible liquid around the frozen core. This step is represented by item (b) in FIG. 5. As indicated previously, one method of applying the first layer of liquid is to spray directly on the frozen surface of the core. Care must be taken to ensure that all surface area of the core is covered with the first liquid.

c. Immediately enrobing the first layer of liquid with a second coating comprising dry food crumbs or particles which are partially embedded in the first coating while in its liquid state. This is accomplished by passing the frozen core with its freshly applied liquid coating through an enrobing chamber illustrated as item (c). This chamber may constitute a trough through which the product rolls and picks up dry cereal crumbs or it may comprise a chamber wherein the cereal particles are spun or distributed into the air surrounding the liquid coated core. This enrobing step must accomplish the continuous application of dry cereal over the full surface of the core material. This is important in order to maintain proper protection of the frozen core substance and to lay the proper base for application of the liquid batter which follows.

d. Subjecting the cereal coated product to a quick freeze environment to congeal the first liquid with the coated food crumbs in bonded configuration to the frozen core. This step, identified as (d) in FIG. 5 congeals the first liquid 13 around the partially embedded cereal particles 14 in a hardened state. For ice cream product, typical temperatures for the freezer will be at minus 30 degrees F. to minus 40 degrees F. Dwell time for the frozen product within the freezer should be from 2 to 5 minutes.

e. Coating the frozen product of the previous step with an uncooked, liquid batter suitable for the desired cooking process. The liquid batter applied in step e of FIG. 5 may be sprayed or merely flowed onto the frozen product. Hereagain, total enrobing and contact needs to occur between the batter and the full surface area of the coated food product. Batter viscosity needs to be sufficiently flowable so that the cracks and grooves around the second coating of cereal are filled to establish a good bond of the batter to the cereal and first liquid coatings. An additional coating of crumbled cookies 16 (FIG. 1) may be applied as represented in Step (e-1) of FIG. 5. These cookies or similar confectionary crumbs should be dry in composition as opposed to having a high oil content. Such crumbs readily adhere and are partially embedded to the liquid batter. These crumbs can be rolled, sprayed or agitated onto the liquid coating by an enrobing device similar to that used in Step (c) or by other methods conventional in the art.

f. Subjecting the coated product to a quick freeze environment to congeal the liquid batter and cookie coating to a hardened state for temporary freezer storage. This freezing Step (f) illustrated in FIG. 5 corresponds to similar Step (d). Hereagain, temperature and dwell time need to be sufficient to harden the batter such that its frozen condition operates as a binder of these outer coatings to the inner cereal 14 and first liquid 13 coatings. In this condition, the frozen food product constitutes an integrally formed composite of inner-frozen core and multiple coatings which are bonded together into a single structure.

g. As a further optional step, applying a final coating including powdered corn syrup solids over the frozen food composite product. Step (g) of FIG. 5 applies the additional corn syrup solids 17 to the surface of the composite structure. As has been previously noted, this final coating reduces breakoff of the enrobing batter of Step (e) and prevents excessive fines formation in the cooking oil. It also adds to the sweetness and crispy texture of the exterior of the product.

Figure 2:
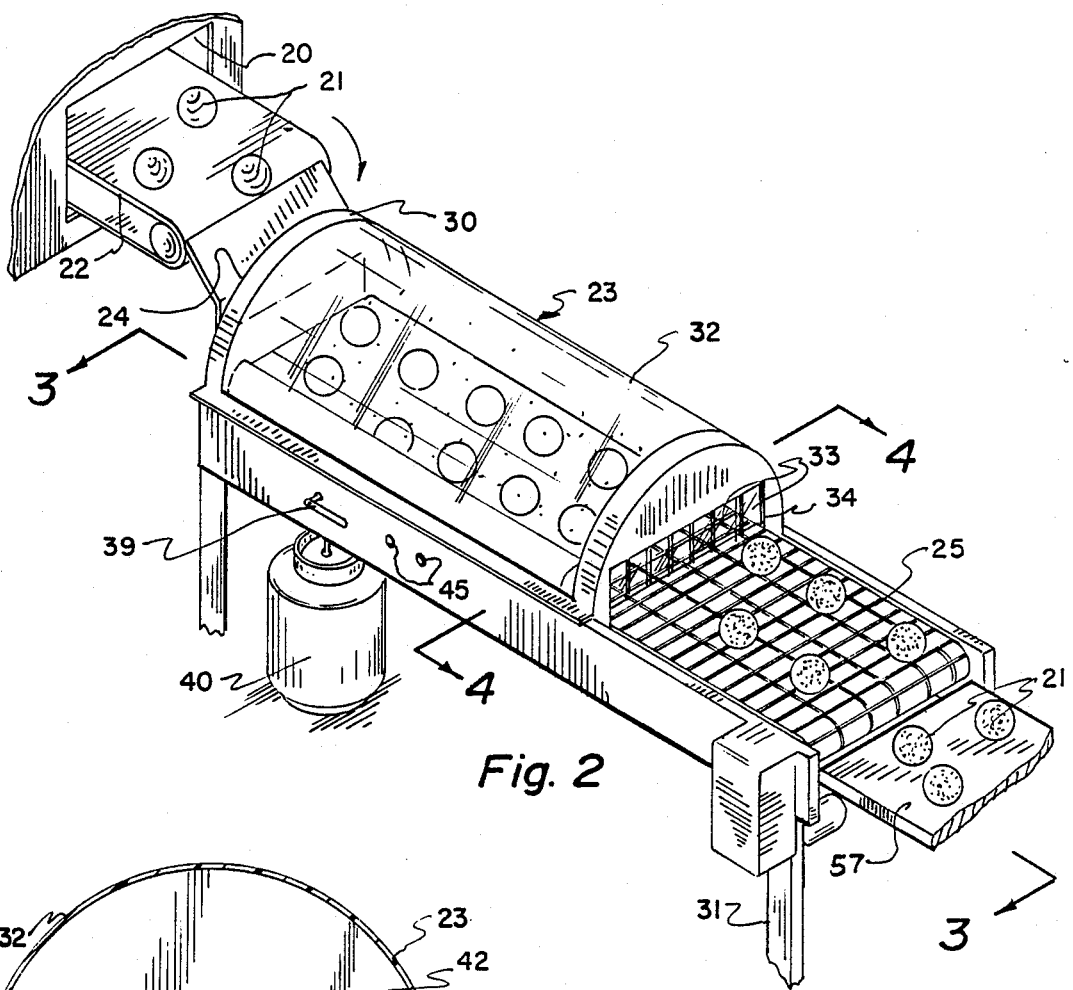
Figure 4:
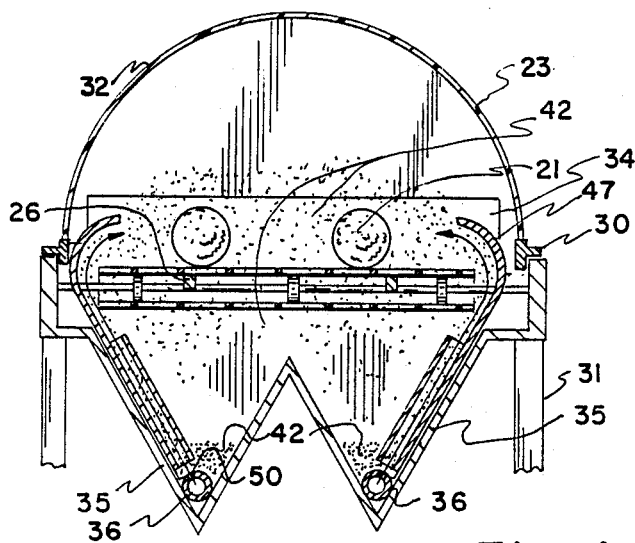

A unique method of applying the powdered corn syrups solids to the frozen composite is illustrated in FIG. 2. Item 20 represents a freezing unit such as might be used in Step (f) of FIG. 5. Frozen product 21 from the freezer 20 is dispensed along a conveyor belt 22 to the entrance of an enrobing assembly 23 which receives the hardened ball. This assembly operates as a coating chamber in which the powdered corn syrup solids are applied to the product 21. The opening 24 of the asembly is coupled to the conveyor belt 22 by a slanted platform which delivers the product 21 to a second conveyor belt 25 for transport through the assembly 23. This second conveyor belt is formed of large wire mesh to allow the free flow of air currents therethrough. At least one support guide 26 is positioned under the belt to support it in a horizontal orientation along with the weight of carried product 21.

The conveyor belt transports the product through an enrobing chamber enclosed within a cover 30 which is supported by a platform which generally supports the rest of the assembly. Part of the cover 32 is transparent to allow constant inspection of the enrobing action occurring within the chamber. Deformable curtains 33 are attached at the ends 24 and 34 of the cover to complete enclosure of the top, sides and ends.

The base of the enrobing chamber is formed by two V-shaped channels 35 having their apex remote from the conveyor belt and their open side more proximate to thereby discharge particulate matter toward the product carried on the belt. A guide channel 47 is inserted along each chamber and configured to direct the solids to the conveyor belt 25. Each V-channel has an air tube 36 at the apex which extends for the length of the chamber 35 and feeds into the channel and includes openings or injection parts 50. An inlet valve or duct 38 is attached at the end of the tube and is coupled to a pressurized air source 40 through a control valve 39.

Powdered corn syrup solids 42 are introduced into the channel 35 via opening 43 in a feed port 37. This feed port includes an impeller or auger 44 for urging the solids along the opening to the channel. As the powder is discharged from the port 37, it falls to the apex of the channel in sufficient quantity to cover the tube 36 when airflow is dormant.

The assembly operates at the end of the production line for the frozen dessert in accordance with the following example. The enrobing chamber is activated after insertion of adequate corn syrup solids through the port 37 or direct through the top (when the cover 30 is removed). After the cover is replaced, the conveyor belt is activated using on-off switches 45. Speed of belt travel is adjusted to select the amount of coating to be applied to the food items 21. Switch 39 is then opened to permit pressurized air flow to the tube 36 for ejection from the air jets or injection ports. The resultant turbulant airflow entrains the powder and forms a turbulant cloud which fills the chamber and enshrouds the food items. After an appropriate dwell time, the food items are dispensed at the end of the channel 34 and fall to a packing table 57.

Product formed pursuant to the foregoing method steps is suitable for packaging as represented in Step (h) of FIG. 5. The present inventive method and product enable long term storage of the frozen composite, as well as transport without crumbling or other forms of degradation. As has been noted in preceding sections, several composition aspects contribute substantially to the favorable physical properties developed in this composite product. For example, it has been found that liquid ice cream premix or a combination of soybean oil and coconut oil develop proper flowability and adherence for retaining the dried cereal 14 at the frozen core 11. A specific formulation of 60% soybean (or peanut) oil and 40% cocoanut oil (non-flavored) have produced very favorable results.

With respect to batter formulations, the following recipe has developed favorable taste and texture in connection with ice cream as the frozen core substance 11. The recipe prescribes the following ingredients and approximate relative amounts thereof:

82 grms. flour
30 grms amaizo (corn syrup solids)
7 grms whey protein concentrate 9 grms nonfat dry milk
5 grms. baking powder
0.5 grms. salt
17 grms. sugar
170 grms. water
1.5 grms. almond extract Although the above recipe is considered preferable, it will be apparent that other formulations for batter could likewise be applied in accordance with the teachings of the present invention.

Accordingly, it is to be understood that the disclosure of specific steps and elements as set forth above are exemplary and are not to be considered limiting except as set forth in the following claims.

We claim:

1. A frozen composite confectionery food product comprising:
   an inner core of frozen confectionery substance;
   a first frozen matrix coating surrounding and being physically bonded at the inner face thereof to the frozen core, said first coating being selected from the group consisting of (i) the inner core confectionery substance liquid form, (ii) a frozen dessert composition other than the inner core, in liquid form and (iii) vegetable oils;
   a second coating made of dry food crumbs or particles which are partially embedded in the first coating surrounding the frozen core; and
   a third coating comprising a frozen, uncooked batter totally enclosing the first and second coatings to form an outer matrix coating which is physically bonded at the inner surface thereof to an exposed exterior surface of the first and second coatings and which can be rapidly deep fat fried to form a hot, crisp exterior covering which is retained around the enclosed, frozen dessert.

2. A product as defined in claim 1, further comprising a fourth coating of particulate food substance which is at least partially embedded in the third coating, said substance being selected from the group consisting of crushed candy, nuts, fruit bits, raisins, dates, and crushed cookies.

3. A frozen food product as defined in claim 1 wherein the first liquid coating includes vegetable oil as a primary constituent ingredient.

4. A frozen food product as defined in claim 1 wherein the first coating includes soybean or peanut oil as a constituent ingredient.

5. A frozen food product as defined in claim 4 wherein the first coating also includes coconut oil as a constituent ingredient.

6. A frozen food product as defined in claim 1 wherein the first coating includes coconut oil as a constituent ingredient.

7. A frozen food product as defined in claim 1 wherein the first coating substantially comprises a combination of soybean oil and coconut oil.

8. A frozen food product as defined in claim 7 wherein the first coating comprises a combination of (i) soybean or peanut oil and (ii) coconut oil in an approximate ratio by volume of 60%/40% based on total oil content in the first coating.

9. A frozen food product as defined in claim 1 wherein the second coating comprises crumbs or small particles of dry cereal product.

10. A frozen food product as defined in claim 9 wherein the second coating comprises crumbs or small particles of rice crispies.

11. A frozen food product as defined in claim 1 wherein the inner core of frozen confectionery substance comprises ice cream.

12. A frozen food product as defined in claim 1 wherein the third coating comprises a batter including the combined ingredients of egg or egg substitute, sugar, milk, flour, baking powder, salt, water and flavoring.

13. A frozen food product as defined in claim 12 wherein whey protein concentrate is used in place of the egg continuent.

14. A frozen food product as defined in claim 12 wherein the batter further comprises corn syrup solids as an ingredient.

15. A frozen food product as defined in claim 12 wherein the ingredients and approximate relative amounts are as follows:
   a. 82 gm flour
   b. 30 gm Amaizo (corn syrup solids)
   c. 7 gm Whey protein concentrate
   d. 9 gm nonfat dry milk
   e. 5 gm baking powder
   f. 0.5 gm salt
   g. 17 gm sugar
   h. 170 gm water
   i. 1.5 gm almond extract 16. A frozen food product as defined in claim 1, further comprising a final coating of corn syrup solids applied in powdered form.

17. A frozen food product as defined in claim 1 wherein the frozen inner core includes an inner core of confectionary substance of marshmellow or fudge.

18. A method for preparing a frozen composite confectionery food product having an inner core of frozen confectionery substance enclosed within an uncooked, multilayered outer coating which enables the frozen product to be deep fried whereby said coating remains intact said method comprising:
   a. forming a core of frozen confectionery substance
   b. applying a first coating of edible liquid around the total surface of the frozen core, said first liquid being selected from the group consisting of (i) a composition of inner core (ii) frozen dessert composition other than the inner core and vegetable oils;
   c. immediately enrobing the first coating with a second coating comprising dry food crumbs or particles so as to partially embed said crumbs or particles in the first coating while in its liquid state;
   d. subjecting the product of step c to a quick freeze environment to congeal the first liquid coating into a frozen matrix with the embedded food crumbs in a bonded configuration and to form an exterior coated surface for the frozen core;
   e. coating the exterior coated surface of the product of step d with an uncooked, liquid batter which is suitable when frozen for being subjected to a deep fry cooking process; and
   f. subjecting the product of the step e to a quick freeze environment to congeal the liquid batter to a hardened state suitable for temporary freezer storage.

19. A method as defined in claim 18, further comprising applying a fourth coating of particulate food substance so as to partially embed the particulate in the uncooked batter prior to congealing, said particulate food substance being selected from the group comprising crushed candy, nuts, fruit bits, raisins, dates, and crushed cookies.

20. A method as defined in claim 18 further comprising the step of applying a final coating including powdered corn syrup solids over the congealed coating of step f in claim 18.

21. A method as defined in claim 18, wherein step c comprises applying a second coating to the first coating comprising small, particulate rice crispies which are partially embedded within the first coating in a liquid state.

22. A method as defined in claim 20, wherein the final coating step comprises applying a shallow covering of powdered corn syrup solids at the outer coating.

23. A method as defined in claim 22 wherein the step of applying the corn syrup solids comprises the subordinate steps of:
  a. preparing a coating chamber with powdered corn syrup solids;
  b. developing a turbulent cloud of the corn syrup solids within the chamber;
  c. transporting the coated, frozen dessert product prepared from steps a - f of claim 18 through the coating chamber to receive a shallow final layer of corn syrup solids; and
  d. removing the final product from the chamber to a freezing unit for storage of the frozen dessert.

24. A method as defined in claim 33 wherein step a comprises agitating the corn syrup solids into a tubulent cloud within the chamber during passage of the frozen dessert product therethrough to develop a shallow, final coating.

25. A method as defined in claim 24, wherein the agitation of the corn syrup solids is accomplished by directing a plurality of pressurized streams of air into a bed of the powder to maintain a cloud of air-suspended corn syrup particles within the chamber.

* * * * *